(12) United States Patent
Ozawa et al.

(10) Patent No.: US 6,425,176 B1
(45) Date of Patent: Jul. 30, 2002

(54) METHOD OF SECURING A STATOR WINDING IN A ROTATING ELECTRICAL MACHINE

(75) Inventors: Masaru Ozawa; Takeo Fukuda, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/648,058

(22) Filed: Aug. 25, 2000

(30) Foreign Application Priority Data

Aug. 26, 1999 (JP) .......................................... 11-240586

(51) Int. Cl.⁷ .......................... H02K 15/12; H02K 15/00
(52) U.S. Cl. ........................ 29/596; 29/606; 264/272.2; 310/42
(58) Field of Search .......................... 29/546, 605, 732; 264/272.2; 310/42, 43

(56) References Cited

U.S. PATENT DOCUMENTS

| | | | |
|---|---|---|---|
| 3,629,925 A | * 12/1971 | Brown, Jr. et al. | ............ 29/596 |
| 3,892,034 A | * 7/1975 | Arakelov et al. | ............. 29/596 |
| 4,868,970 A | * 9/1989 | Schultz et al. | ................ 29/596 |

FOREIGN PATENT DOCUMENTS

JP          2847800          6/1998

* cited by examiner

Primary Examiner—Peter Vo
Assistant Examiner—A. Dexter Tugbang
(74) Attorney, Agent, or Firm—Carrier, Blackman & Associates, P.C.

(57) ABSTRACT

A method of securing a stator winding such that it has improved heat dissipation performance includes steps of inserting a stator winding into a stator core soaking these components in a varnish tank while being held together as one, and after the varnish has soaked into the stator winding 15, withdrawing the winding and core from the varnish tank. Then a mandrel comprising an outer peripheral pressing portion made by wrapping a fluororubber around an outer periphery of a mandrel body made of a fluoroplastic, is inserted into the stator winding. After this, the varnish is heat hardened with the stator core, the stator winding, and the mandrel 33 all held together as one. In so doing, the outer peripheral pressing portion is deformed with irregularities replicating the inner periphery of the stator winding 15. Hence on the inner peripheral side of the stator winding, the varnish resin hardens with the irregularities retained. As a result, the effective inner peripheral surface area of the stator winding with the hardered varnish is increased, and heat dissipation is thus improved.

9 Claims, 6 Drawing Sheets

METHOD OF SECURING A STATOR WINDING IN A ROTATING ELECTRICAL MACHINE

BACKGROUND OF THE INVENTION

1. Field of the Invention

The present invention relates to a method of securing a stator winding to an inner periphery of a stator core having no slots, and to a rotating electrical machine incorporating a slotless stator with a stator winding secured to an inner periphery of a stator core having no slots.

2. Description of the Related Art

Heretofore, as a method of securing a stator winding such as a cylindrical stator winding, to an inner periphery of a cylindrical stator core having no slots, there is known the securing method disclosed in Japanese Patent No. 2847800.

With this known securing method, at first a cylindrical stator winding is accommodated inside a stator core, and then a round rod shaped inner diameter jig made of a fluoroplastic is inserted inside the stator winding. Next, the stator core, the stator winding and the inner diameter jig are then immersed as one in a resin tank used for resin impregnating. After resin impregnating step, these are withdrawn from the impregnating resin tank as a single body and in this state the resin is heated and hardened. After this, the inner diameter jig is withdrawn from the stator winding. That is to say, with this securing method, the stator core and the stator windings are secured by the adhesive strength of the resin at the time of resin hardening.

However, with high speed rotating electrical machines where the rotor is rotated at high speed (around 100,000 rpm) inside the inner periphery of the stator winding, there is a problem from the point of efficiency, with the heat generated due to heat loss occurring in the stator winding and the stator core.

Additionally, with With the abovementioned securing method, since the inner diameter jig is made from a fluoroplastic, then even though the inner diameter jig presses against the inner periphery of the stator winding at the time of resin hardening, the outer periphery of the inner diameter jig will not deform with irregularities replicating the inner periphery of the stator winding.

Therefore, on the inner periphery of the stator winding, the resin hardens so as to form a smooth cylindrical inner surface which does not retain the irregularities of the inner peripheral surface of the stator winding. Consequently the inner peripheral surface area of the stator winding having the hardened resin thereon, which serves as a heat dissipating surface at the time of operation is reduced, and portions where the resin is thickly attached occur on the inner peripheral face of the winding, so that sufficient heat dissipation performance cannot be obtained.

SUMMARY OF THE INVENTION

The present invention takes into consideration the above situation with the object of improving heat dissipation performance of a stator winding.

In order to achieve the above object, the present invention adopts the following means. That is to say, a securing method for a stator winding according to the present invention involves securing the cylindrical stator winding to an inner periphery of a cylindrical stator core having no slots, wherein a mandrel comprising an outer peripheral pushing portion made from a resilient material for pressing an inner periphery of the stator winding is inserted with the stator winding which is inserted into the stator core, and in this condition, a thermosetting resin which is adhered to the stator winding is heat hardened.

With such a construction, when the outer peripheral pushing portion of the mandrill presses into the inner periphery of the stator winding, this outer peripheral pushing portion is deformed into irregularities replicating the inner periphery of the stator winding. Consequently, when the thermosetting resin adhered to the stator winding is heat hardened with the stator core, the stator winding and the mandrel all held together as one, the mandrel thermally expands and the outer peripheral pressing portion deforms with irregularities along the inner periphery of the stator winding. Therefore, with the inner peripheral side of the stator winding, the thermosetting resin hardens with the irregularities retained. As a result, the effective inner peripheral surface area of the stator winding is increased and heat dissipation is thus improved.

With the securing method for a stator winding according to the present invention, the outer peripheral pushing portion may be constructed by securing the resilient material to the outer periphery of the mandrel body, or by making the mandrel body itself from a resilient material. For this resilient material, a rubber such as silicone rubber or fluororubber may be used. Moreover, in the case where the resilient material is secured to the outer periphery of the mandrel body, for example, a fluoroplastic may be used for the mandrel body.

With a rotating electrical machine incorporating a slotless stator according to the present invention, where a stator winding is secured with a thermosetting resin to an inner periphery of a stator core which has no slots, an inner periphery of the stator winding has an irregular hardened surface made by hardening the thermosetting resin, along the irregular shape of the inner periphery of the stator winding.

With such a construction, heat dissipation is improved more than for the case where the inner periphery of the stator winding is formed as a smooth cylindrical surface, due to the increase in the effective inner peripheral surface area of the stator winding. Therefore, even in the case where the rotor is rotated at high speed inside the stator winding, heat generated due to heat loss is effectively cooled, and use at higher loads, that is to say higher outputs, becomes possible. That is, even with the same loss, by improving the cooling efficiency, the temperature can be kept low, and hence higher loads and higher outputs become possible for the same allowable temperature.

DESCRIPTION OF THE PREFERRED EMBODIMENTS

Hereunder is a description of embodiments of the present invention with reference to the drawings.

Figure 1:
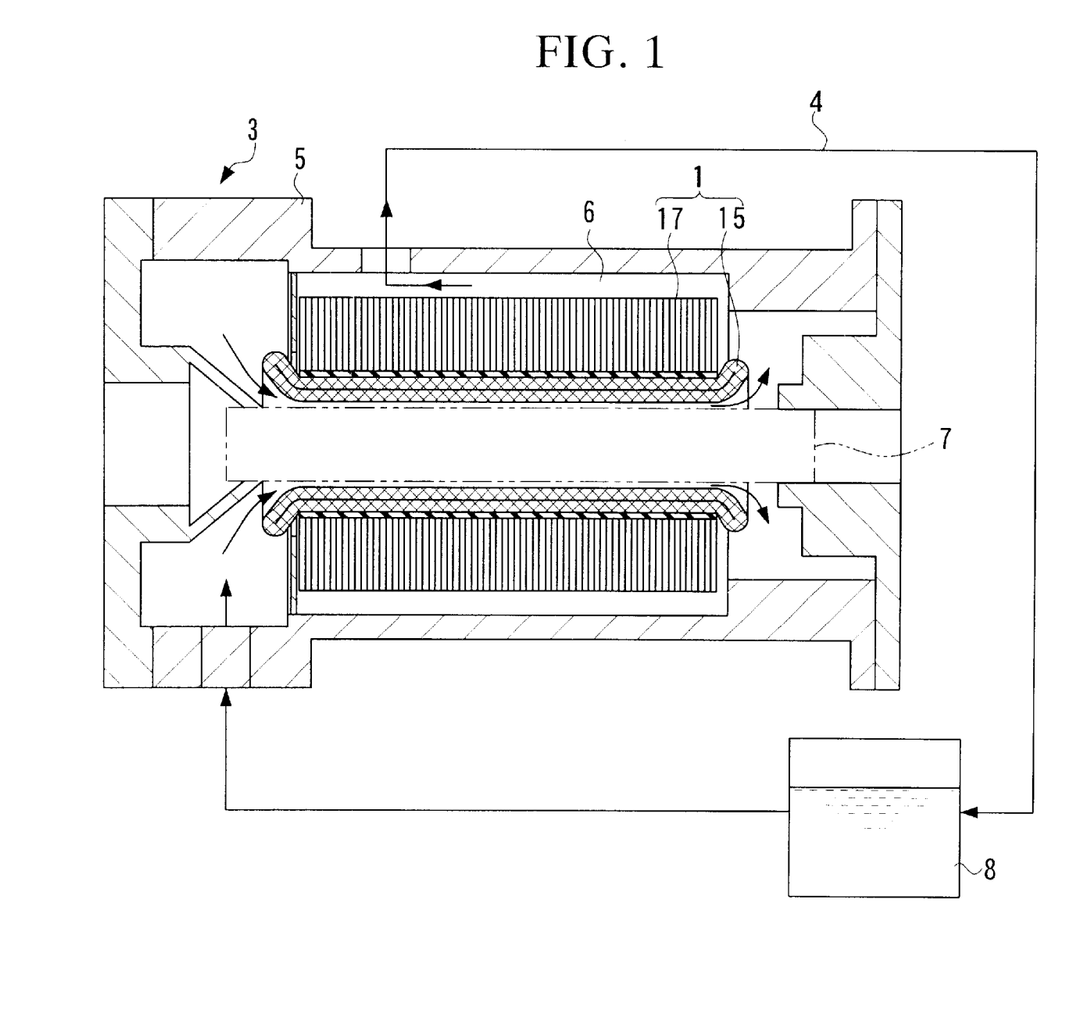
FIG. 1 is a longitudinal cross-sectional view showing an embodiment of a rotating electrical machine according to the present invention.

FIG. 1 shows a rotating electrical machine 3 incorporating a slotless stator 1. This rotating electrical machine 3 is suitable to use in a high speed rotating electric machine which is used for example at several kW to several tens of kW, and at rotational speeds above several ten thousand rpm.

With the rotating electrical machine 3, the outer shape is formed from a casing 5, and a rotor 7 is rotatably arranged via bearings (not shown) along a central axis of the casing 5. An oil passage 6 constituting one part of an oil path 4 is formed in the casing 5. Lubricating oil is supplied to the oil passage 6 from a supply source 8, and by means of this lubricating oil, lubrication of the bearings and cooling of the slotless stator 1 is simultaneously performed. At this time, the cooling of the slotless stator 1 is performed in sequence from the inner periphery to the outer periphery, as shown by the arrow in FIG. 1.

A permanent magnet serving as a magnetic field generating device is incorporated into the rotor 7. This permanent magnet 11 is constructed so that p (where p is an even number of two or more) magnetic poles for generating a magnetic flux in the radial direction, are formed on the outer surface of the rotor 7. For the permanent magnet, a rare earth magnet such as a Sm—Co or Nd—Fe—B sintered magnet is suitable.

Figure 2:
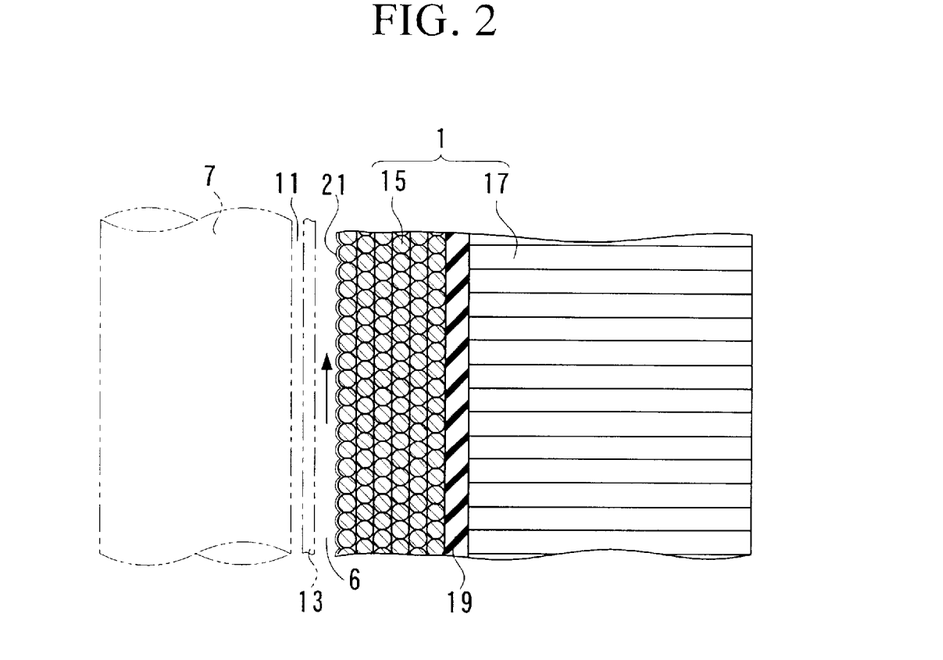
FIG. 2 is an enlarged view of the main parts of FIG. 1.

The slotless stator 1, as shown in FIG. 2 is arranged around the rotor 7, forming a small gap 11 via an inner tube 13.

This inner tube 13 is for insulating the lubricating oil which flows on the inner peripheral side of the slotless stator 1 (shown by the arrow in FIG. 2), and is made for example from a zirconia ceramic having non magnetic and non conducting properties. The inner tube 13 may be replaced with another ceramic such as alumina.

The slotless stator 1 is one which is not formed with slots for securing a stator winding 15. Moreover, the slotless stator 1 is constructed with the stator winding 15 located on the rotor 7 side and a stator core 17 located on the casing 5 side.

The stator core 17 is in the form of a hollow cylindrical body with a cylindrical surface which is not formed with slots on the inner peripheral surface thereof, and is secured to the casing 5 so that the oil passage 6 for passing lubricating oil (shown by the arrow in FIG. 1) is formed between the outer periphery thereof and the inner periphery of the casing 5. Moreover, the stator core 17 is constructed by laminating a large number of ring shaped electrical steel plates in the plate thickness direction. Here the stator core 17 may also be of a divided configuration.

The stator winding 15, as with the stator core 17, is a hollow cylindrical shape, and is secured by means of an insulation layer 19 using a thermosetting resin such as varnish so that the outer peripheral face of the stator winding 15 faces the inner face peripheral face of the stator core 17. That is, the stator winding 15 and the stator core 17 are secured by the adhesive strength when the varnish impregnated into the stator winding 15 oozes out to the outer peripheral side of the stator winding 15 and hardens.

On the other hand, with the inner periphery of the stator winding 15, the oozed out varnish does not harden to form a smooth cylindrical surface, but is formed as a corrugated or irregular hardened surface 21 with the varnish hardened along the inner periphery of the stator winding 15. This corrugated hardened surface 21 is one which is formed at the time of securing the stator winding 15 to the stator core 17.

Hereunder is a description using FIG. 3 through FIG. 10, of an embodiment of a method of securing a stator winding according to the present invention. At first, a cylindrically shaped stator winding 15 is formed by combining together a plurality of approximately rhombic shape coil segments 23a, 23b, and 23c. A more specific explanation is as follows.

Figure 10:
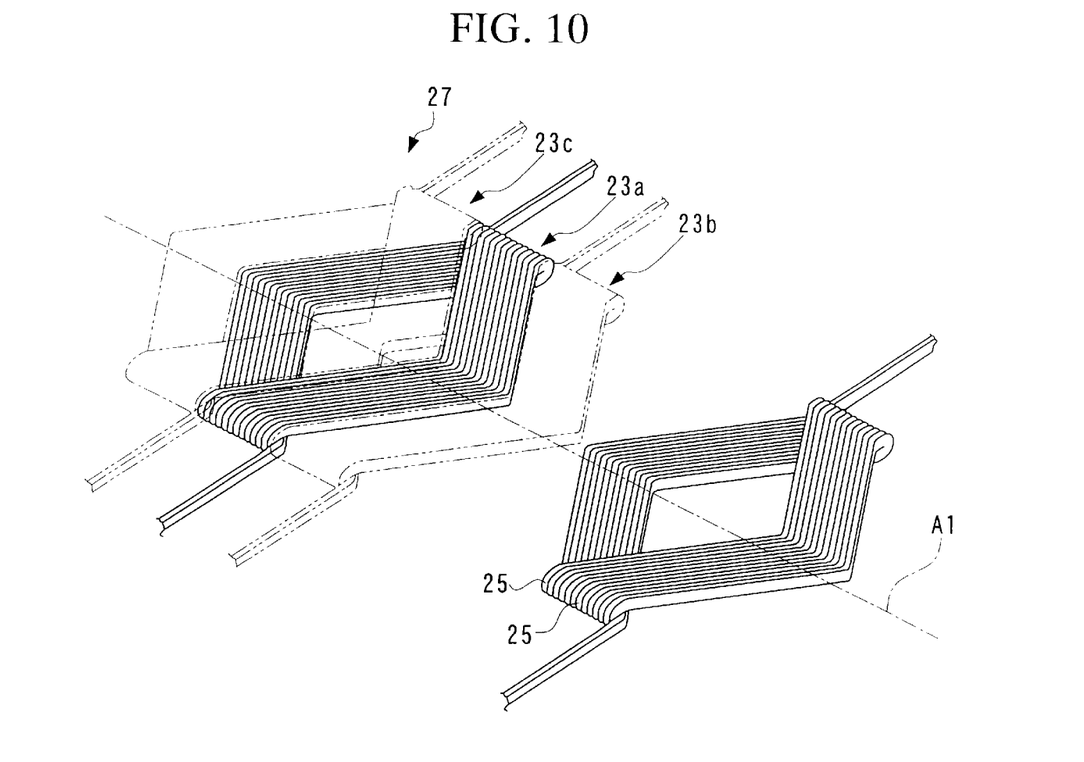
FIG. 10 is a process drawing showing a condition where a band shaped body is formed from a plurality of coil segments.
Figure 11:
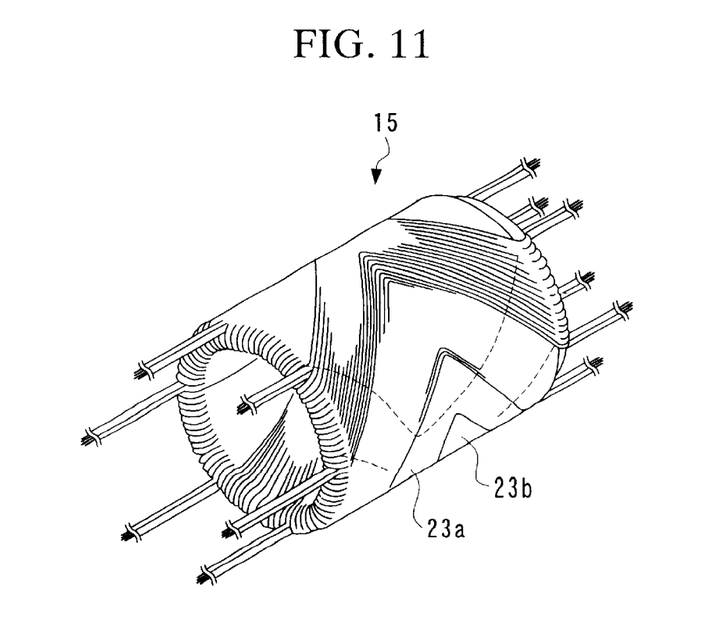
FIG. 11 is a perspective view showing a stator winding formed by rolling the band shaped body comprising the plurality of coil segments, into a cylindrical shape.

The coil segments 23a, 23b and 23c are formed by forming turns by winding a wire sheaf 25 of a plurality of fine wires composed of conductors bundled together, through one turn in an approximately rhombic shape, and then winding and arranging a plurality of the turns so that the turns are sequentially shifted continuously so as to be adjacent to each other in the direction of one diagonal A1 of the rhombic shape (refer to FIG. 10). Then after sequentially shifting and overlapping the coil segments 23a, 23b and 23c in the direction of the diagonal A1 to form a band shaped body 27, the band shaped body 27 is rolled into a hollow cylindrical shape to thereby form the stator winding 15 (refer to FIG. 11).

Figure 3:
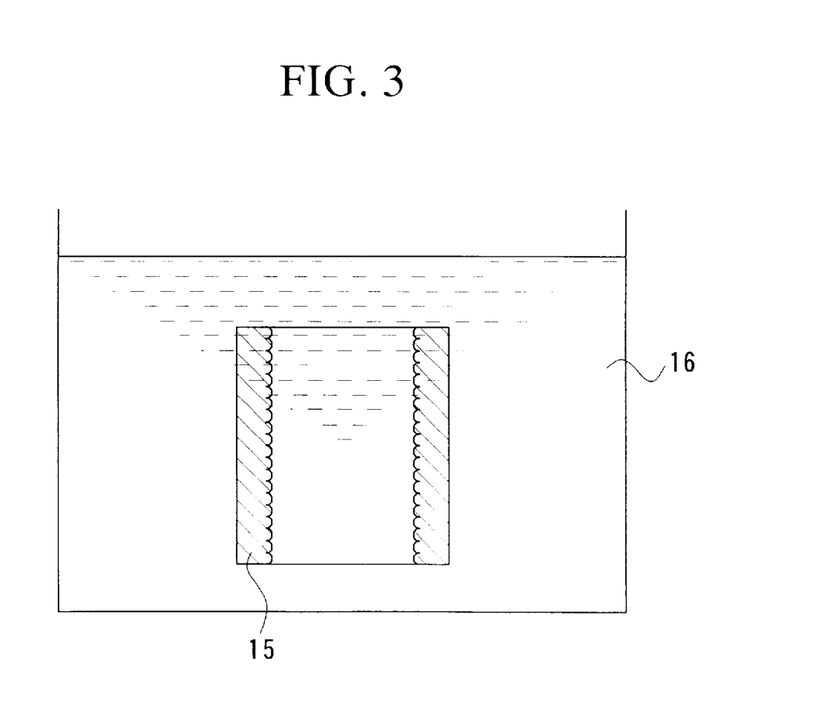
FIG. 3 is a diagram for explaining an embodiment of a method of securing a stator winding according to the present invention, and particularly showing a condition where a stator winding is being immersed in a solution of BN particles mixed in alcohol.
Figure 4:
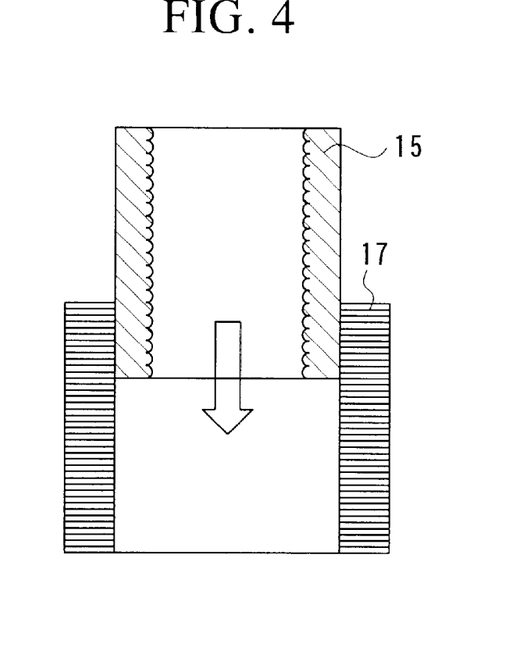
FIG. 4 is a process drawing showing a condition where the stator winding is inserted into a stator core.
Figure 5:
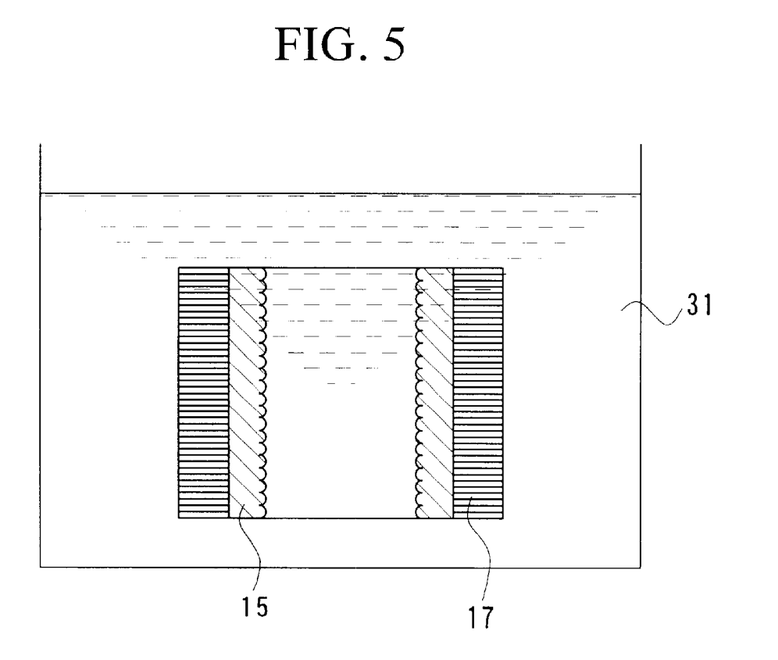
FIG. 5 is a process drawing showing a condition where the stator core and stator winding are immersed in a varnish tank while being held together.

Next, the stator winding 15 is immersed in a solution 16 of BN particles mixed in ethyl alcohol, so that the BN particles fill from the surface of the stator winding 15 into the interior thereof (refer to FIG. 3). Here rather than immersing, a technique involving dripping may be used. After this, the stator winding 15 is withdrawn from the solution 16 and air dried to evaporate the volatile alcohol.

Next a silicone sheet (in FIG. 4 this is omitted) constituting the insulating layer 19 is wrapped around the outer periphery of the stator winding 15, and the stator winding 15 is inserted into the stator core 17. After this, the stator core 17 and the stator winding 15 are held together as one and soaked in a varnish impregnation tank 31 (refer to FIG. 5).

Subsequently, after impregnating the varnish into the stator winding 15 using a method such as vacuum pressure impregnation, the stator core 17 and the stator winding 15 are withdrawn from the varnish impregnation tank 31 while being held together. Then, a mandrel 33 is inserted into the inner periphery of the stator winding 15 (refer to FIG. 6), and the stator core 17, the stator winding 15 and the mandrel 33 are all heated while being held together as one, so that the varnish is heat hardened (refer to FIG. 7).

Figure 6:
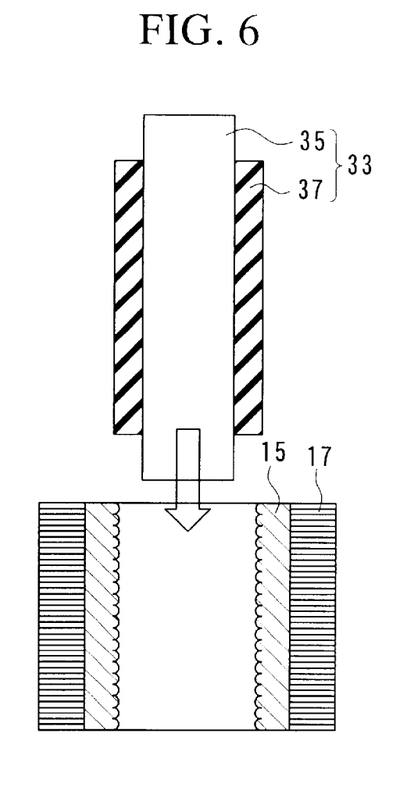
FIG. 6 is a process drawing showing a condition where a mandrel is inserted into the inner periphery of the stator winding which has been inserted into the stator core.
Figure 7:
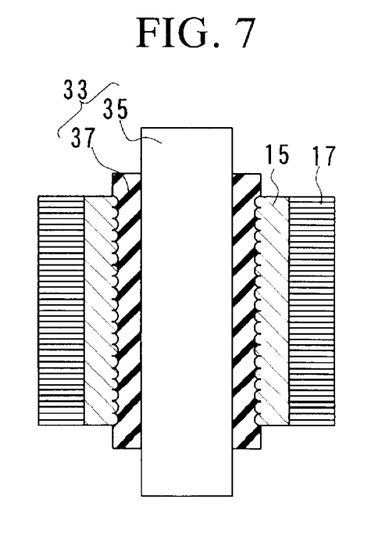
FIG. 7 is a process drawing showing a condition where the varnish is heat hardened with the stator core, the stator winding, and the mandrel held together as one.
Figure 8:
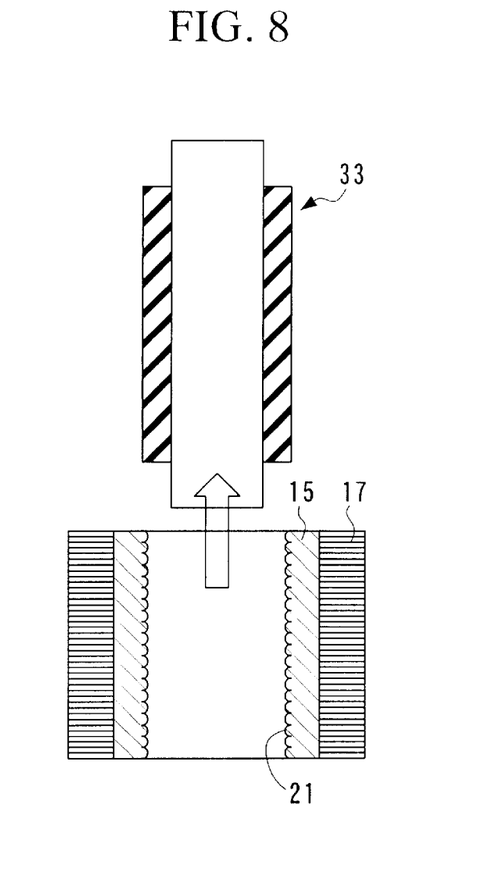
FIG. 8 is a process drawing showing a condition where after the varnish is heat hardening, the mandrel is withdrawn from the stator winding.

The mandrel 33 comprises a round bar mandrel body 35 made from a fluoroplastic (for example PTFE, PFA etc.), and an outer peripheral pressing portion 37 formed by wrapping a resilient material such as silicone rubber or fluororubber wrapped around the outer periphery of the mandrel body 35. The outer peripheral pressing portion 37 contacts with the inner periphery of the stator winding 15 when the mandrel body 35 thermally expands at the time of heat hardening, and presses the stator winding 15 against the inner peripheral side of the stator core 17.

At the time of this thermal expansion, the outer peripheral pressing portion 37, as shown in FIG. 7, is formed with irregularities which replicate the inner periphery of the stator winding 15. As a result, the inner periphery the stator winding 15 is hardened with the impregnated varnish such that the irregularities of the winding surface are maintained. Consequently, after the varnish hardens the mandrel 33 is withdrawn from the stator winding 15, a corrugated or irregular hard surface 21 is formed on the inner periphery of the stator winding 15 (refer to FIG. 8).

In this way, with the method of securing a stator winding according to the present embodiment, the outer peripheral pressing portion 37 of the mandrel 33 is constructed so as to be deformable into irregularities which replicate the inner periphery of the stator winding 15. Therefore, when the varnish impregnated into the stator winding 15 is heat hardened with the stator core 17, the stator winding 15 and the mandrel 33 held together as one, the corrugated hardened surface 21 of the hardened varnish with the irregularities maintained, is formed on the inner periphery of the stator winding 15.

Consequently, with the rotating electrical machine 3 incorporating a slotless stator 1 where the stator winding 15 is secured to the stator core 17 by this securing method, the effective inner peripheral surface area of the stator winding 15 can be increased more than in the conventional case where the inner periphery of the stator winding 15 is formed as a smooth cylindrical surface with hardened varnish, and hence heat dissipation is improved. Moreover, with this embodiment, as shown in FIG. 2, an oil passage 6 is formed between the inner periphery of the stator winding 15 and the inner tube 13, and lubricating oil for cooling is circulated through this oil passage 6.

Furthermore, with the present embodiment, since the inner periphery of the stator winding 15 is made to be a corrugated hardened surface 21, then rather than with the case where the inner periphery of the stator winding 15 is a cylindrical surface, it is possible to harden a resin layer on the inner peripheral surface of the stator winding 15 so as to be thin and uniform in thickness and replicate the irregularities of the winding. Hence the heat dissipation area can be increased, and the lubricating oil can be made to flow in a greater quantity in the oil passage 6. Therefore, even if used in a high speed rotating electrical machine where the rotor 7 rotates inside the stator winding 15 at high speeds exceeding 100,000 rpm, it is possible to effectively cool the heat generated due to heat loss, and a high load, and high output can be realized.

Here with the abovementioned embodiment, as part of the mandrel 33 for pressing into the inner periphery of the stator winding 15, the outer peripheral pressing portion 37 deformable into irregularities is constructed by securing a resilient material such as silicone rubber or fluororubber to the outer periphery of the mandrel body 35 made from a fluoroplastic. However a mandrel 41 where the whole of the mandrel is made from the abovementioned resilient material may also be used.

Figure 9:
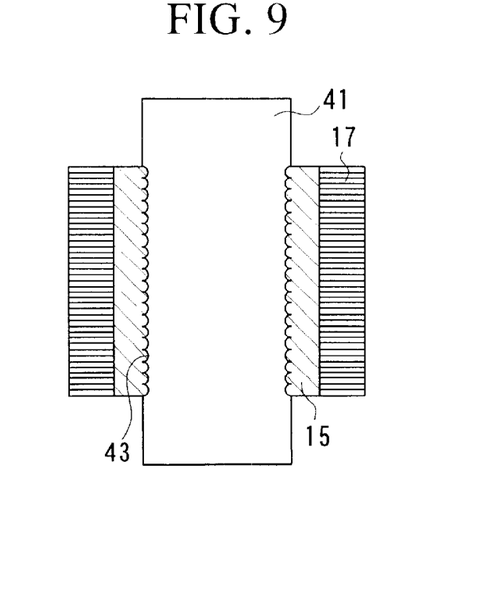
FIG. 9 is a drawing for explaining another embodiment of a method for securing a stator winding according to the present invention, and particularly showing a condition where varnish is heat hardened while a mandrel made from a resilient material is pressing into the stator winding.

In this case also, as shown in FIG. 9, if the varnish is heat hardened with the stator core 17, the stator winding 15, and the mandrel 41 all held together as one, then with the thermal expansion of the mandrel 41, an outer peripheral pressing portion 43 of the mandrel is deformed with irregularities replicating the inner periphery of the stator winding 15, and the varnish hardens along this corrugated deformation. Therefore, with this securing method also, an effect the same as mentioned above can be obtained. Moreover, with this method, since the mandrel 41 is constructed only from the resilient material, the number of parts is decreased and the construction of the mandrel 41 is simplified.

Furthermore, with the above embodiment, the plurality of coil segments 23a, 23b and 23c of approximately rhombic shape are assembled together to form the cylindrical shape stator winding 15. However, needless to say the stator winding 15 may be formed in a cylindrical shape by some other method.

Although there have been described in detail what are at present considered to be the preferred embodiments of the invention, it will be understood by persons skilled in the art that variations and modifications may be made thereto without departing from the gist, spirit or essence of the invention. The scope of the invention is indicated by the appended claims.

What is claimed is:

1. A securing method for fitting a cylindrical stator winding to an inner periphery of a cylindrical stator core having no slots, comprising the steps of:

inserting a mandrel comprising an outer peripheral pushing portion made from a resilient material for pressing an inner periphery of said stator winding into said stator winding which is inserted into said stator core, and in this condition, heat hardening a thermosetting resin which is adhered to said stator winding, wherein during said heat hardening step said outer peripheral pushing portion of said mandrel thermally expands into pressing engagement with said inner periphery of said stator winding and is deformed so as to replicate irregularities of said inner periphery of said stator winding.

2. The securing method for the stator winding according to claim 1, wherein a silicone rubber or fluororubber which has thermal expansivity is used for the resilient material.

3. The securing method for the stator winding according to claim 1, wherein said mandrel further comprises a mandrel body, and the resilient material is secured to an outer periphery of said mandrel body.

4. The securing method for the stator winding according to claim 3, wherein a silicone rubber or fluororubber is used for the resilient material.

5. The securing method for the stator winding according to claim 2, wherein said mandrel is made entirely from the resilient material.

6. The securing method for the stator winding according to claim 5, wherein a silicone rubber or fluororubber is used for the resilient material.

7. The securing method according to claim 1, wherein when said thermosetting resin is heat hardened, an inner peripheral surface of the stator core having no slots formed by the hardened resin on the inner periphery of the stator winding has an irregular shape corresponding to an irregular shape of the inner periphery of the stator winding.

8. The securing method according to claim 1, comprising a further step of impregnating said stator winding with said thermosetting resin before said mandrel insertion step.

9. The securing method for the stator winding according to claim 1, wherein when said thermosetting resin is heat hardened, an inner peripheral surface of said thermosetting resin on said inner periphery of said stator winding also replicates said irregularities of said inner periphery of said stator winding.

* * * * *

UNITED STATES PATENT AND TRADEMARK OFFICE
CERTIFICATE OF CORRECTION

PATENT NO.    : 6,425,176 B1                                    Page 1 of 1
DATED         : July 30, 2002
INVENTOR(S)   : M. Ozawa T. Fukuda It is certified that error appears in the above-identified patent and that said Letters Patent is hereby corrected as shown below:

<u>Title page,</u>
Item [57], ABSTRACT,
Line 3, after "core" insert a comma;
Line 12, delete "33";
Line 18, change "hardered" to -- hardened --.

<u>Column 1,</u>
Line 37, change "with With" to -- with --.
Line 67, change "with" to -- into --.

<u>Column 2,</u>
Line 5, change "mandrill" to -- mandrel --.
Line 7, change "into" to -- with --.

<u>Column 3,</u>
Line 54, change "non magnetic and non" to -- non-magnetic and non- --.

<u>Column 4,</u>
Line 10, change "face peripheral face" to -- peripheral face --.

<u>Column 5,</u>
Line 46, after "Hence" insert a comma.

<u>Column 6,</u>
Line 46, change "2" to -- 1 --.

Signed and Sealed this

Eighteenth Day of February, 2003

JAMES E. ROGAN
*Director of the United States Patent and Trademark Office*